3,200,088
POLYMERIZATION OF ALKYLENIMINES
William F. Tousignant and Carl Moore, Midland, Mich., assignors to The Dow Chemical Company, Midland, Mich., a corporation of Delaware
No Drawing. Filed Aug. 30, 1962, Ser. No. 220,547
5 Claims. (Cl. 260—2)

This invention concerns a new process for the polymerization of alkylenimines. More specifically, the invention concerns the use of small quantities of poly-halogenated alkanes, in conjunction with trace amounts of certain metals or metal compounds, to initiate mass or solution polymerization of alkylenimines.

Polyalkylenimines are used extensively for a wide variety of purposes. For example, they are employed as impregnating agents to impart desirable characteristics to textiles and paper, as adhesive bonding agents and as flocculating agents. The presently known methods for preparing these polymers employ a solvent system, generally water, to yield a solution of the polymer product. Complete removal of the solvent is extremely difficult and in the process of solvent removal permanent and undesirable changes in the polymer characteristics often result. Although the polyalkylenimine is generally employed in the form of an aqueous solution, it would frequently be more advantageous and economical to employ the pure undiluted polymer.

It has now been discovered, in accordance with the present invention, that polyhalogenated alkanes may be advantageously employed, in conjunction with trace amounts of certain metals or metal compounds, to initiate the mass or solution polymerization of alkylenimines. Although the polymerization of bulk monomer is a unique and desirable feature, the method of the invention may also be employed with a solvent system such as water, water-soluble alcohols or mixtures thereof.

The polyhalogenated alkane employed in the method of the present invention is chloroform or a compound having the general formula:

$$C_nX_{2n+2}$$

where X is fluorine, chlorine, bromine or a combination thereof and $n=1$ or 2.

A quantity of polyhaloalkane sufficient to initiate the polymerization process, from about 1 to 5 weight percent based on the alkylenimine, is used. A concentration below one percent is undesirable since the polymerization rate becomes prohibitively slow and the final product viscosity, i.e., molecular weight, is objectionably low. At concentrations above about 5 weight percent, insoluble polymer gels tend to form.

The metal or metal compound adjuvant polymerization initiator is employed in trace amounts and is selected from elemental or ionic forms of metals in the Mendeleev Periodic Table Groups VIII and IB, i.e., iron, cobalt, nickel, ruthenium, rhodium, palladium, osmium, iridium, platinum and copper, silver and gold. From about 5 to 500 parts per million (hereafter p.p.m.) metal based on the monomer used is preferred although the upper limit is not critical since the effectiveness of the metal is apparently due to that amount which is dissolved by the monomer and any excess is merely present as a residual impurity. There is no appreciable difference apparent in results obtained when equal weights of the metal are employed in elemental and in ionic form.

The temperature maintained during the reaction influences the rate of polymerization and the final product molecular weight. The operable temperature range is from about 0° C. to the boiling point of the bulk monomer or monomer solution employed. Increasing the temperature accelerates the reaction and a temperature range of from about 25° to 60° C. is preferred. Maximum viscosity results when a temperature of from about 40° to 60° C. is utilized. Normally the reaction is continued until polymerization is essentially complete. The length of time necessary to achieve this result will vary from about 1 to 10 days depending upon the concentrations of metal and polyhaloalkane employed as well as the temperature maintained.

The viscosity of the polymer, which is considered as a measure of molecular weight, is influenced by the same factors which effect the reaction rate. The viscosity increases as the amount of metal employed is increased with maximum viscosity resulting when approximately 50 p.p.m. of metal, monomer basis, is used. Similarly, the viscosity of the final product increases to a maximum value when the amount of polyhaloalkane initiator is increased to about 4 weight percent, monomer basis. As noted previously the viscosity of the final product is influenced by the reaction temperature with a maximum value reached when a temperature of about 50° C. is maintained. The viscosity of the final product does not appear to be influenced by the presence of a solvent in the polymerization system.

The alkylenimine monomer employed is selected from the group consisting of ethylenimine (hereinafter EI), propylenimine, 1,2-butylenimine, 2,3-butylenimine, isobutylenimine, trimethylenimine, and hexamethylenimine.

The following examples describe completely representative specific embodiments of the present invention. These examples are not to be interpreted as limiting the invention other than as defined in the claims.

EXAMPLE 1

In this series of experiments the concentrations of metal and polyhaloalkane initiators were varied to determine their effects on the polymerization of EI. The monomer, metal and polyhaloalkane were mixed in stoppered tubes and shaken for a period of ten days at a reaction temperature of 25° C. The results are tabulated in Table I below. In this, and all subsequent examples, the viscosity values, determined at 100° F. and reported as centipoises (hereafter cp.), are those for aqueous 10 weight percent polymer solutions as obtained using a modified Ostwald viscometer. In all cases polymerization of the monomer was essentially completed at the end of a ten day period. This completion of reaction was shown by the absence of weight loss after vacuum drying the product overnight at 50° C. The copper was employed by adding sufficient metal powder to EI to provide a saturated solution. The EI solution of copper was analyzed to establish the metal concentration and subsequently diluted with pure EI to the stated concentration.

*Table I*

| Exp. No. | G. of EI | Cu (p.p.m.) | G. CCl₄ | Viscosity (cp.) |
|---|---|---|---|---|
| 1 | 4.16 | 7 | 0.08 | 1.88 |
| 2 | 4.16 | 28 | 0.08 | 2.16 |
| 3 | 4.16 | 70 | 0.08 | 2.13 |
| 4 | 4.16 | 28 | 0.16 | 2.99 |

An additional experiment was conducted in which 0.10 g. of trichlorobromomethane was employed in place of carbon tetrachloride, with 4.16 g. of EI and 70 p.p.m. Cu. The viscosity of the polymer product so obtained was 2.12 cp.

The data in the foregoing experiments demonstrate the increase in polymer viscosity with increasing Cu content (up to a maximum here of 28 p.p.m. Cu) and increasing polyhaloalkane content.

EXAMPLE 2

This experiment was conducted to determine the effect of employing copper metal as compared with copper ion in the polymerization of EI. The runs were conducted at 25° C. and the reaction was essentially complete after three days at which time the viscosity measurements were made. The mixing and agitation procedures of Example 1 were followed. The concentrations and viscosities are tabulated below in Table II. In this example the copper metal and copper salts were added directly to the EI to be polymerized.

*Table II*

| Exp. No. | G. of EI | G. Cu powder | CuCl$_2$.2H$_2$O (G. Cu) | G. CCl$_4$ | Viscosity (cp.) |
|---|---|---|---|---|---|
| 5 | 4.16 | 0 | 0 | 0.08 | (¹) |
| 6 | 4.16 | 0.0025 | 0 | 0.08 | 1.74 |
| 7 | 4.16 | 0 | 0.001 | 0 | (¹) |
| 8 | 4.16 | 0 | 0.001 | 0.08 | 1.72 |

¹ No polymerization.

In the above runs no polymerization occurred unless both polyhaloalkane and copper (elemental or ionic) were present.

EXAMPLE 3

In this example a procedure similar to Example 2 was employed but the temperature was maintained at 50° C. Heavy-walled test tubes were charged with distilled EI, carbon tetrachloride and electrolytic grade copper powder. The tubes were capped with aluminum-lined crown caps and tumbled in a thermostatically controlled temperature bath for 22 hours at 50° C. The tubes were then cooled, uncapped and the volatiles removed by vacuum drying for 16 hours. After determining the weight of the polymer residue the viscosity of aqueous 10 weight percent polymer solutions was determined. The results are tabulated in Table III.

*Table III*

| Exp. No. | G. EI | G. Cu | G. CCl$_4$ | G. polymer | Percent conversion | Viscosity (cp.) |
|---|---|---|---|---|---|---|
| 9 | 8.32 | 0 | 0 | 0.174 | 2.1 | |
| 10 | 8.32 | 0.003 | 0 | 0.150 | 1.8 | |
| 11 | 8.32 | 0 | 0.08 | 4.557 | 54.9 | 2.21 |
| 12 | 8.32 | 0.003 | 0.08 | 7.524 | 90.4 | 2.84 |

Although some polymerization occurs in the absence of the metal at elevated temperatures (Exp. No. 11) the result serves to emphasize the importance of the metal in order to obtain a higher percent yield of polymer and a higher viscosity, i.e. molecular weight, polymer product.

EXAMPLE 4

A series of experiments, according to the general procedure of Example 2, was conducted in which the monomer was employed in aqueous solution. The following table, Table IV, is a compilation of data from these tests which were run at 50° C. and 75° C. Polymerization was essentially complete after 24 hours. Copper metal and copper and iron salts were employed as indicated. In each case 10 g. of H$_2$O was used.

*Table IV*

[8.32 g. of EI and 10 g. of water were used in each run]

| Exp. No. | G. CCl$_4$ | G. metal | Temp., °C. | Viscosity (c.p.) |
|---|---|---|---|---|
| 12 ¹ | 0 | 0 | 50 | (²) |
| 13 ¹ | 0 | 0.003 Cu | 50 | (²) |
| 14 | 0.08 | 0.003 Cu | 50 | 4.12 |
| 15 | 0.159 | 0.003 Cu | 50 | 5.10 |
| 16 | 0.318 | 0.003 Cu | 50 | 9.2 |
| 17 | 0.477 | 0.003 Cu | 50 | ³ 25.0 |
| 18 | 0.159 | CuCl—0.003 g. Cu | 50 | 7.78 |
| 19 | 0.159 | CuCl$_2$—0.002 g. Cu | 50 | 6.62 |
| 20 | 0.159 | FeCl$_2$—0.002 g. Fe | 50 | 2.01 |
| 21 | 0.159 | FeCl$_3$—0.001 g. Fe | 50 | 2.35 |
| 22 ¹ | 0 | 0 | 75 | (²) |
| 23 ¹ | 0 | 0.003 Cu | 75 | (²) |
| 24 | 0.016 | 0.003 Cu | 75 | 3.37 |
| 25 | 0.048 | 0.003 Cu | 75 | 3.17 |
| 26 | 0.08 | 0.003 Cu | 75 | 3.43 |
| 27 | 0.143 | 0.003 Cu | 75 | 4.10 |
| 28 | 0.318 | 0.003 Cu | 75 | 4.24 |
| 29 | 0.318 | CuCl—0.003 g. Cu | 75 | 4.23 |
| 30 | 0.318 | FeCl$_3$—0.001 g. Fe | 75 | 3.49 |

¹ Controls.
² No polymer.
³ Gel.

It is evident from the results of the foregoing experiment that increasing polyhaloalkane content increases the molecular weight and that this effect is more pronounced at 50° C. than at 75° C. Both elemental copper and copper salts are shown to be more effective than iron salts in production of a higher molecular weight product. Any other Group VIII or IB metals as such or in simple ionic form can be substituted with effective results.

We claim:
1. A method for preparing polyalkylenimines which comprises mixing together at a temperature of 0° to 75° C.:
   (A) an alkylenimine selected from the group consisting of ethylenimine, propylenimine, 1,2-butylenimine, 2,3-butylenimine, isobutylenimine, trimethylenimine and hexamethylenimine;
   (B) from about 1 to 5 weight percent, based on alkylenimine employed, of a polyhalogenated alkane selected from the group consisting of chloroform and a compound having the formula

$$C_nX_{2n+2}$$

where X represents a member of the group consisting of fluorine, chlorine, bromine and mixtures thereof and $n$ is an integer from 1 to 2 inclusive; and
   (C) a metallic species of the group consisting of elemental and ionic forms of metals of Periodic Table Groups VIII and IB, said species being present at a concentration of at least about 5 p.p.m. metal based on the alkylenimine employed, for a time sufficient to effect substantial polymerization of said alkylenimine.

2. The method of claim 1 wherein the alkylenimine is ethylenimine.

3. The method of claim 1 wherein the metallic species is copper.

4. The method of claim 1 wherein the alkylenimine is ethylenimine, the polyhalogenated alkane is carbon tetrachloride and the metallic species is copper.

5. The method of claim 1 wherein said alkylenimine is employed as a solute in a solvent selected from the group consisting of water, water-soluble alcohols and mixtures thereof.

References Cited by the Examiner

FOREIGN PATENTS 461,354  2/37  Great Britain.

OTHER REFERENCES

Salomon: "Recueil des Travaux Chimiques des Pays-Bas," vol. 68, 1949, pp. 903–914.

Jones et al: Journal Organic Chemistry, vol. 9, pp. 125–149 (1944).

MURRAY TILLMAN, *Primary Examiner.*

IRVING MARCUS, *Examiner.*